United States Patent [19]

Sugiyama et al.

[11] 4,072,114
[45] Feb. 7, 1978

[54] CONTOUR TRACING SEWING MACHINE

[75] Inventors: Akira Sugiyama, Nagoya; Yoshikazu Yamamoto, Toyoake; Shiro Yamada, Kasugai, all of Japan

[73] Assignee: Brother Kogyo Kabushiki Kaisha, Nagoya, Japan

[21] Appl. No.: 697,877

[22] Filed: June 21, 1976

[30] Foreign Application Priority Data

July 1, 1975 Japan .................................. 50-81662

[51] Int. Cl.² ............................................ D05B 21/00
[52] U.S. Cl. ................................................ 112/121.12
[58] Field of Search ...................... 112/121.12, 121.11, 112/121.14, 121.15; 318/577; 250/202; 350/96 B

[56] References Cited

U.S. PATENT DOCUMENTS

| | | | |
|---|---|---|---|
| 3,385,245 | 5/1968 | Ramsey et al. | 112/121.12 |
| 3,742,878 | 7/1973 | Byrne et al. | 112/121.12 |
| 3,758,784 | 9/1973 | Vischulis | 250/202 X |
| 3,933,556 | 1/1976 | Strack | 350/96 B X |

*Primary Examiner*—Werner H. Schroeder
*Assistant Examiner*—Peter Nerbun
*Attorney, Agent, or Firm*—George B. Oujevolk

[57] ABSTRACT

This invention relates to a contour tracing sewing machine for forming a line of seam on a workpiece in conformity with a contour of a stitching templet of a desired shape.

The tracing device used in the contour tracing sewing machine comprises a light source for emitting light towards the stitching templet, and a light sensing head consisting of a plurality of optical fibers arranged in an annular form for transmitting the light radiated on the stitching templet to a plurality of photoelectric cells. The tracing device further comprises a device for selecting a predetermined tracing direction according to electric signals produced from the plurality of photoelectric cells, so that the stitching templet and the workpiece may be shifted relatively to the light source and the sensing head by a drive device of an open-loop type in the tracing direction thus selected.

7 Claims, 13 Drawing Figures

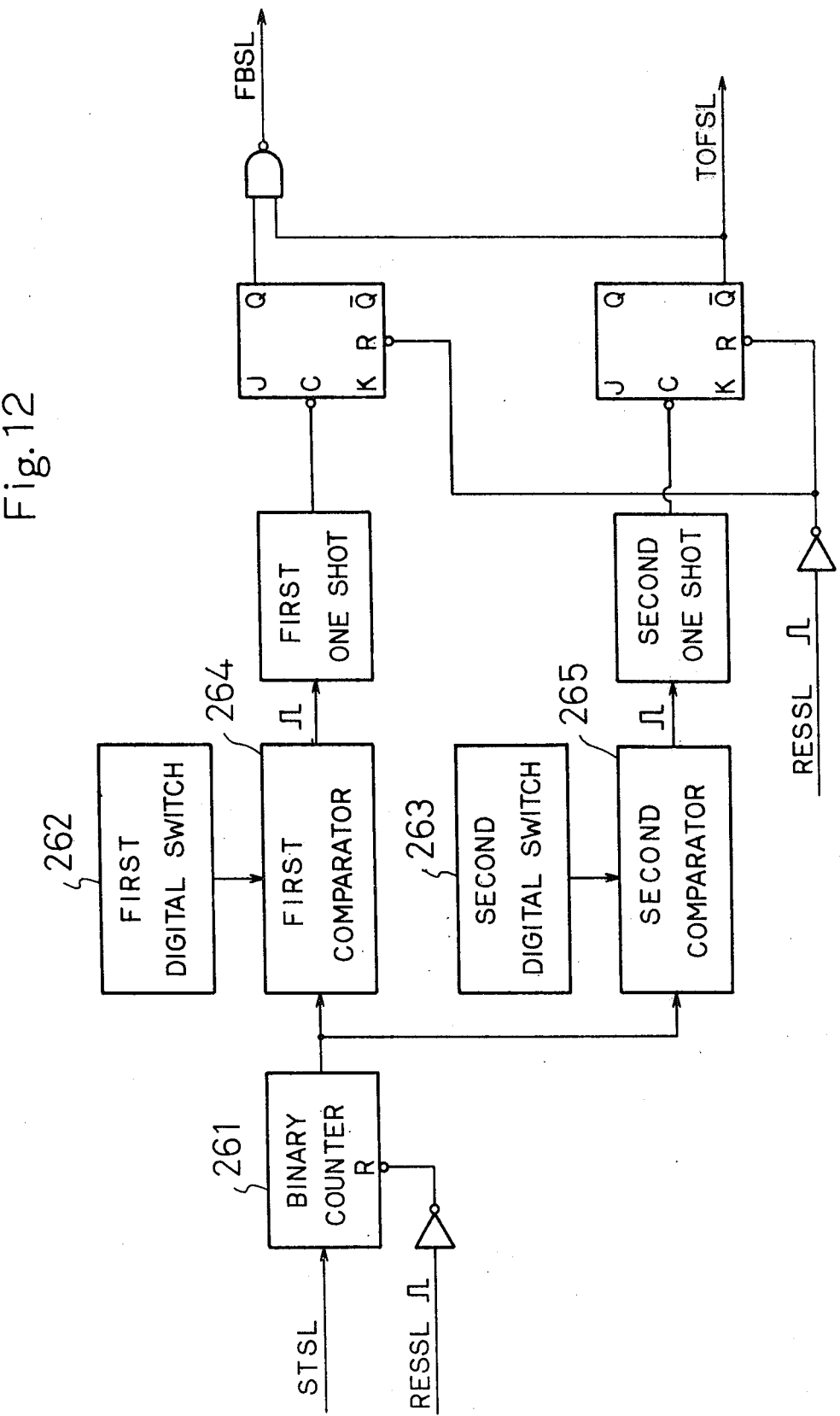

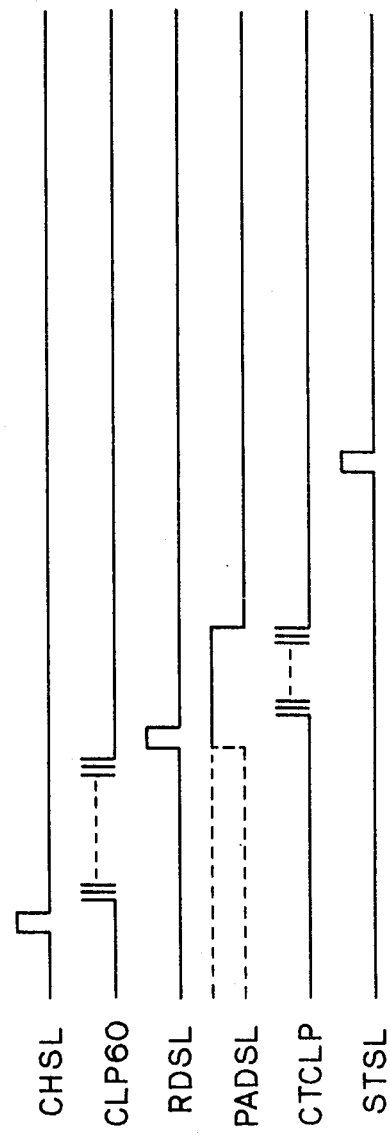

CONTOUR TRACING SEWING MACHINE

BACKGROUND OF THE INVENTION

There have hitherto been proposed a variety of optical tracing devices for reproducing a workpiece of a desired shape by optically tracing a contour of a given shaped templet.

As an optical tracing device, a scanning type tracer, in most cases, has been used for performing a tracing operation.

Usually, a circumferential portion of the templet is circularly scanned by the scanning rays of light radiated from a light source rotating at a given rate, and the scanning rays of light are reflected on the surface of the templet or transmitted through the templet, thus being received by the sensing head. The scanning rays of light thus received are converted by a converter to electric signals, for example, voltage, proportional to the intensity of the scanning light. The voltage thus converted is compared with a predetermined reference voltage, so that a difference between both voltage levels will be negatively fed back to servo-motors. The templet and the workpiece to be reproduced will be shifted by the servo-motors, while tracing the contour of the templet. This is because in the optical tracing device of this type, the intensity of the scanning rays of light received by the sensing head, i.e., analogue signals, is used as tracing signals necessary for tracing the contour of the templet. However, the optical tracing device has been susceptible to external conditions, with the failure of exact tracing of the contour of the templet used. A tracing device of the prior art requires servo-motors for effecting a tracing operation, resulting in the complexity in construction, as well as requiring an expensive servo-controlling system and other mechanisms associated therewith.

OBJECT OF THE INVENTION

It is accordingly an object of the present invention to provide a contour tracing sewing machine having a device for optically tracing a contour of a given shaped stitching templet, whereby a workpiece to be sewn is seamed in conformity with the contour of said stitching templet.

It is another object of the present invention to provide a contour tracing sewing machine having a device wherein, as tracing signals necessary for tracing a contour of a stitching templet of a given shape, digital signals are used for performing a tracing operation.

It is a further object of the present invention to provide a contour tracing sewing machine having a device for effecting a tracing operation by using an open-loop type drive device.

SUMMARY OF THE INVENTION

The present invention relates to an apparatus, wherein a stitching templet and a workpiece to be sewn are moved at an interval while tracing a circumferential portion or contour of the stitching templet, thereby forming a seam conformable to the contour of the stitching templet on the workpiece.

According to the present invention with the movement of the stitching templet and a workpiece, the sensing means comprises a light source for emitting rays of light in parallel onto the stitching templet and a sensing head for receiving rays of light transmitting through the stitching templet. The sensing head consists of a plurality of optical fibers disposed in equi-spaced relation to one another in the circumferential direction of a circle having a radius of a predetermined length. The plurality of optical fibers are mounted with their one ends opposing a light source, so that rays of light transmitting through the stitching templet may enter into these fibers, and with the other ends connected to a plurality of photoelectric cells, respectively. In accordance with a plurality of electric signals respectively produced from these photoelectric cells, said sensing means detects, from among the plurality of optical fibers, an angular position at the mid point between the neighboring two optical fibers assuming the condition in which said two fibers are changing from brightness to darkness or from darkness to brightness as viewed in a given circumferential direction; stated otherwise, an angular position at the mid point at which the circumferential portion or contour of the stitching templet is positioned. The detecting means includes a first counter for counting the number of optical fibers existing in the range from a predetermined basic reference point to the mid point between the neighboring two optical fibers, on the circumference, which assume the changing posture described. These optical fibers are positioned in one of the four absolute quadrants, respectively, as well as in any of the four relative quadrants, according to a configuration of the stitching templet used. The basic reference point and three reference points are predetermined in the four absolute quadrants, respectively. A number of code signals are prepared beforehand, which express tracing directions from the center of the circle formed by these optical fibers toward respective mid points between respective neighboring two optical fibers, and in response to the signals representing the absolute quadrant in which the mid point detected is positioned and output signals from a counter which can count the number of optical fibers existing in the range from the reference point corresponding to the absolute quadrant to the mid point detected one code signal is selected. X and Y pulses necessary for shifting the stitching templet and the workpiece along the X and Y axes which cross each other at right angles are produced from a pulse generating device by the numbers commensurate with the code signals selected, and then fed to a drive device for shifting the stitching templet and workpiece.

If a difference between the number of optical fibers $Vn-1$ precedingly counted by the first counter and the number of optical fibers $Vn$ succeedingly counted, i.e., a difference $= |Vn-1 - Vn|$, be within a given value, then a calculating means is actuated for summing up the numbers of respective pulses which are proportional to pulse differences between the numbers of X, Y pulses precedingly produced from a pulse generating device and the numbers of X, Y pulses corresponding to the code signals succeedingly selected and which are smaller than the pulse differences, and the numbers X, Y pulses corresponding to said code signals, whereby the numbers of X, Y pulses produced from the pulse generating device are compensated. Further, in case $|Vn-1 - Vn|$ is beyond a given value, a certain dividing ratio is selected properly according to a value of the difference $|Vn-1 - Vn|$ from among a plurality of predetermined dividing ratios, so that by the operation of dividing means for dividing the numbers X, Y pulses precedingly produced from the pulse generating device by the dividing ratio thus selected, the numbers of X, Y pulses to be produced from the pulse generating device may be controlled. Simultaneously with the above operation, in accordance with the difference $|Vn-1 - Vn|$ and the relative quadrant in which the mid point detected is positioned, the reference point is changed from the initial point to a point spaced apart by a given angle therefrom on the circumference of the circle, as viewed in a given circumferential direction.

A second counter is provided for counting the frequency of the detecting operation of detecting means for detecting the circumferential portion of the stitching templet. When the frequency of the detecting operation counted by the second counter has reached predetermined frequencies, switching means is actuated, in response to the output signals from the second counter, to change over the detecting means selectively either to the case where there is detected a mid point between two neighboring optical fibers assuming a condition in which same is changing from brightness to darkness or to the case where there is detected a mid point between two neighboring optical fibers assuming a condition in which same is changing from darkness to brightness, whereby the advancing movement or backward movement of the stitching templet and workpiece is controlled.

BRIEF DESCRIPTION OF THE DRAWINGS

FIG. 12 illustrates a tracing direction controlling circuit used in the embodiment of the present invention; and, FIG. 13 illustrates the wave forms of signals used in the embodiment of the present invention.

DETAILED DESCRIPTION OF A PREFERRED EMBODIMENT

Description will be given to a preferred embodiment of the present invention in conjunction with the accompanying drawings.

Figure 5:
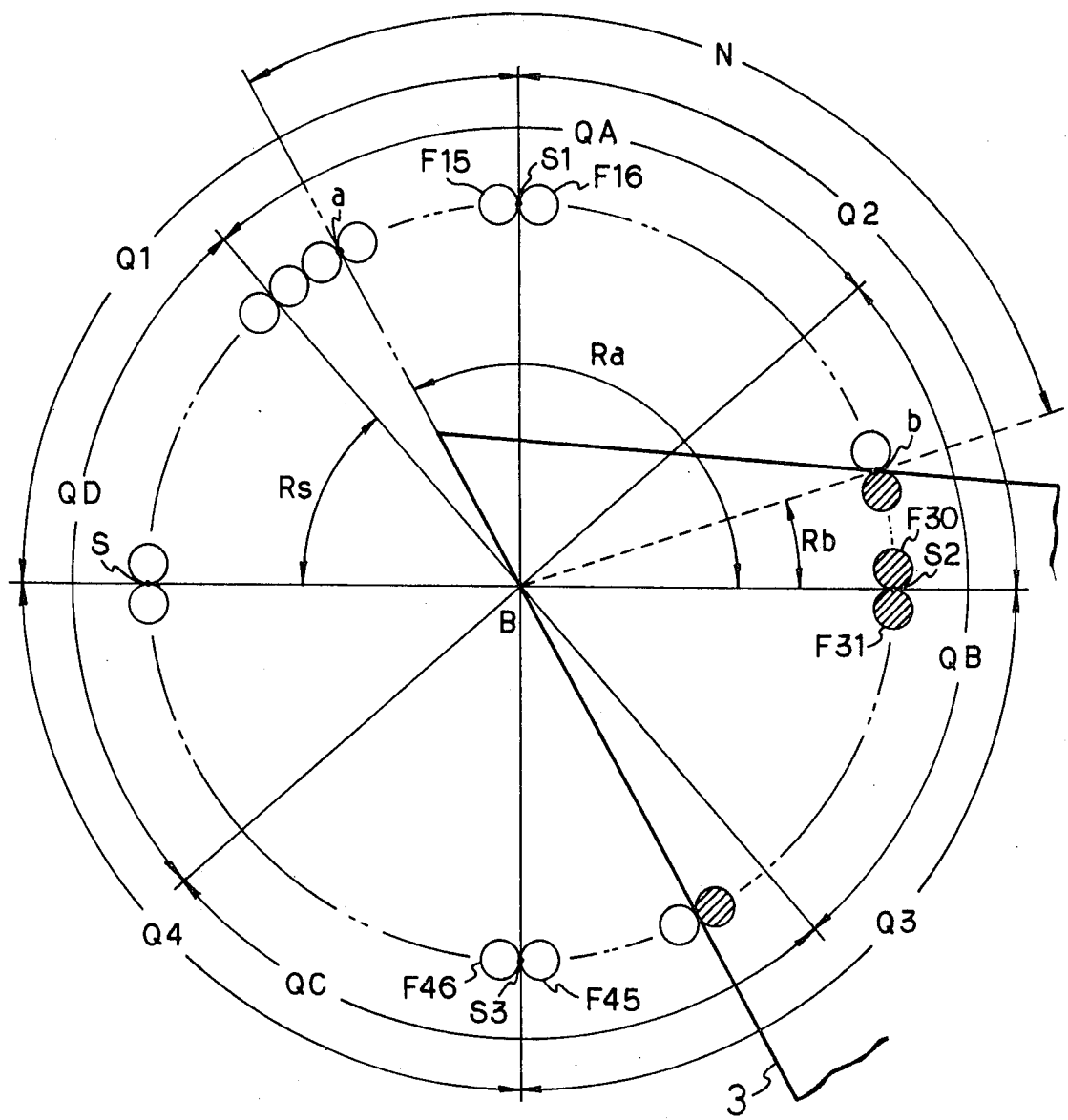

In a sewing position in which a sewing machine 1 is disposed, a workpiece 3 held in a predetermined fashion in a loading position on a supporting table 2 is shifted across a path in which a reciprocating motion of the needle 1a of the sewing machine 1 is effected. A mounting plate 4 is made of a transparent material and attached to the supporting table 2 interlockably therewith. A stitching templet 5 is made of a light-shielding material and molded into a desired configuration, said stitching templet being positioned on the mounting plate 4. A light source 6 is fixed above the mounting plate 4 in a manner to radiate parallel rays of light through a lens 7 on the stitching templet 5 placed on the mounting plate 4. A light sensing head 8 is fixed below the mounting plate 4 and consists of 60 pieces of optical fibers 9 disposed in equi-spaced relationship on the circumference of a circle having a radius of a predetermined pitch of stitch P. Sixty pieces of optical fibers 9 are respectively positioned in one of the four absolute quadrants Q1, Q2, Q3, and Q4, as seen in FIG. 5, as well as in one of the four relative quadrants QA, QB, QC and QD, each of which is biased by an angle corresponding to eight pieces of optical fibers, i.e., Rs — an angle of 48° from said absolute quadrants, as viewed in the circumferential direction Z in FIG. 5. The parallel rays of light which have transmitted through the mounting plate 4 respectively enter these optical fibers from their one ends 9a. Sixty pieces of photoelectric cells 10 connected to the other ends 9b of these optical fibers 9 convert the light transmitted from these optical fibers 9 into electric signals.

Figure 6:
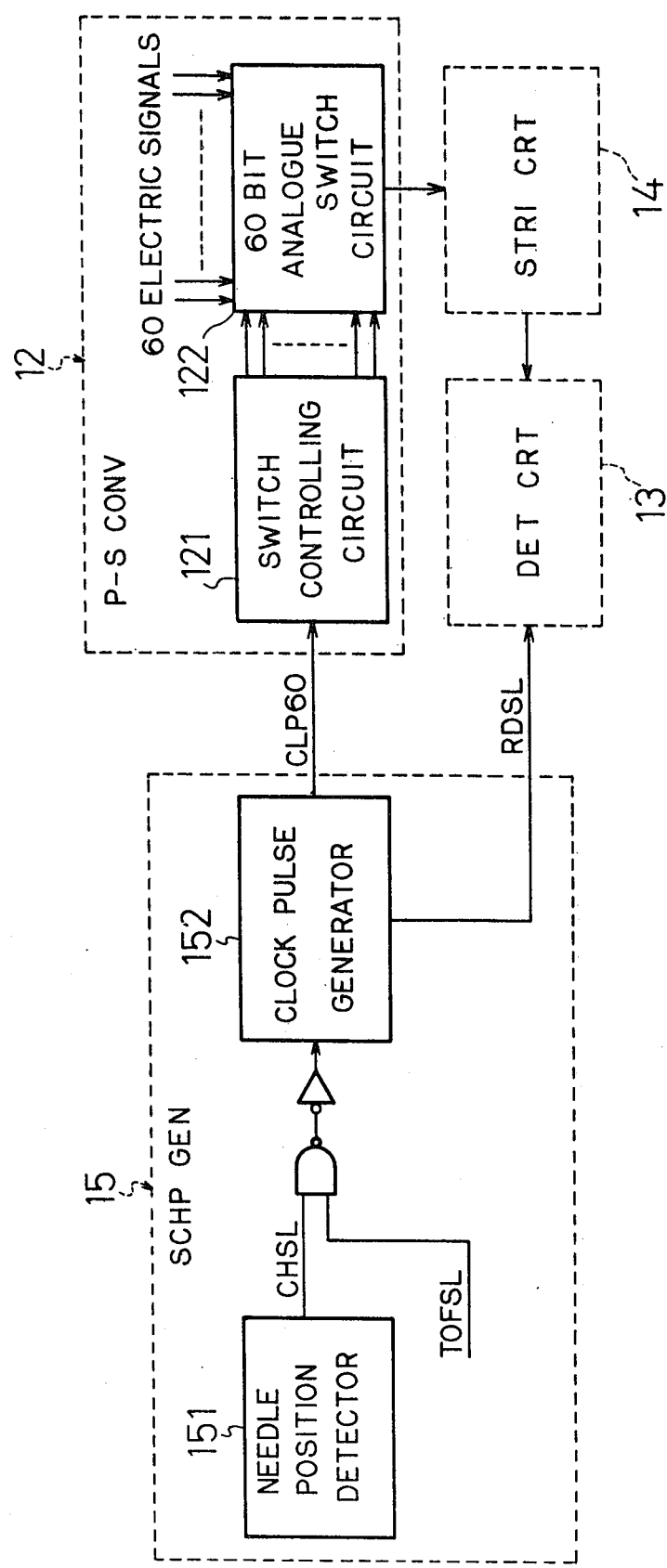
FIG. 6 illustrates a converter and a synchrogenerator used in the embodiment of the present invention.
Figure 7:
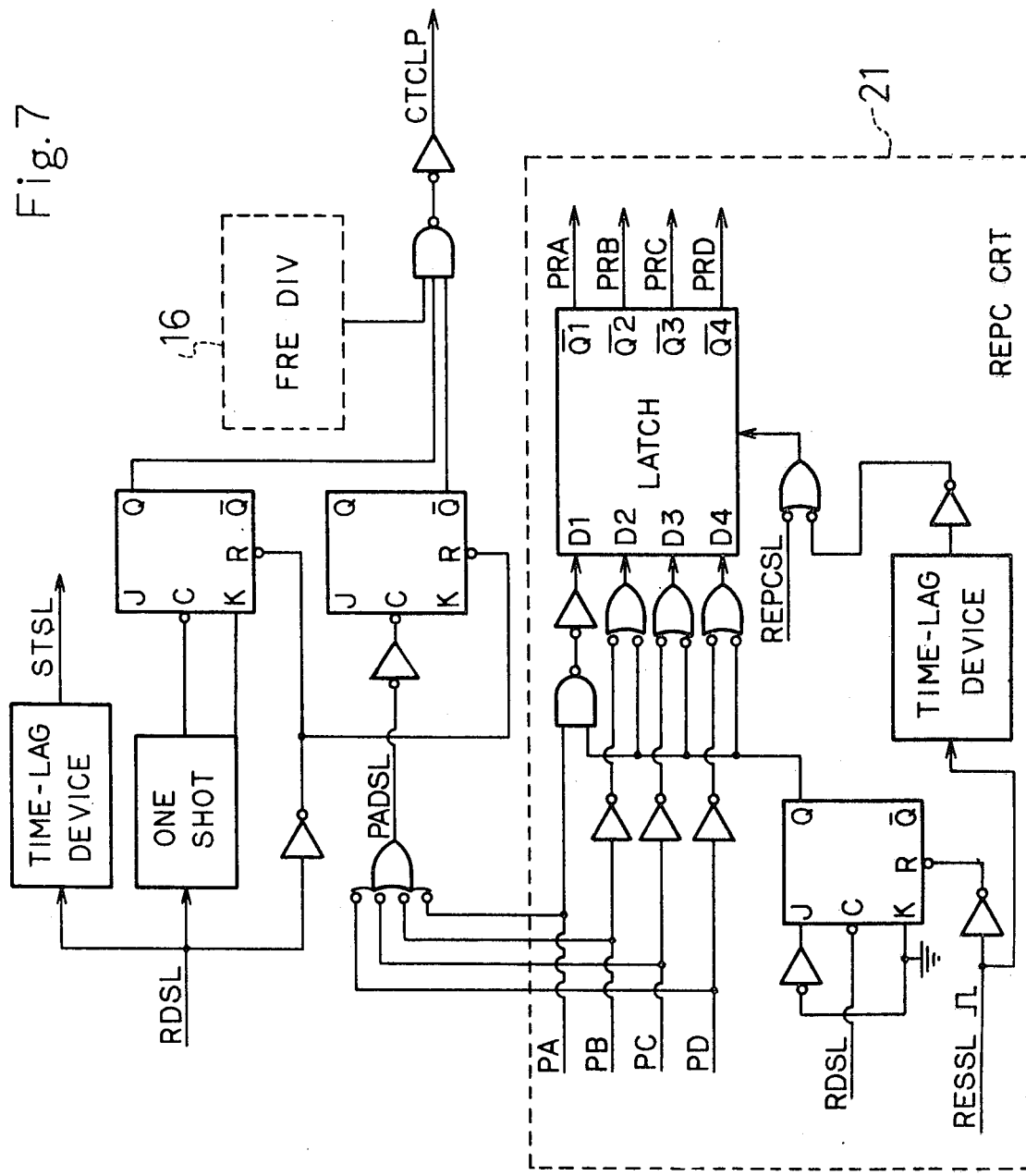
FIGS. 7 and 8 show a detecting circuit and a reference-point changing circuit used in the embodiment.
Figure 8:
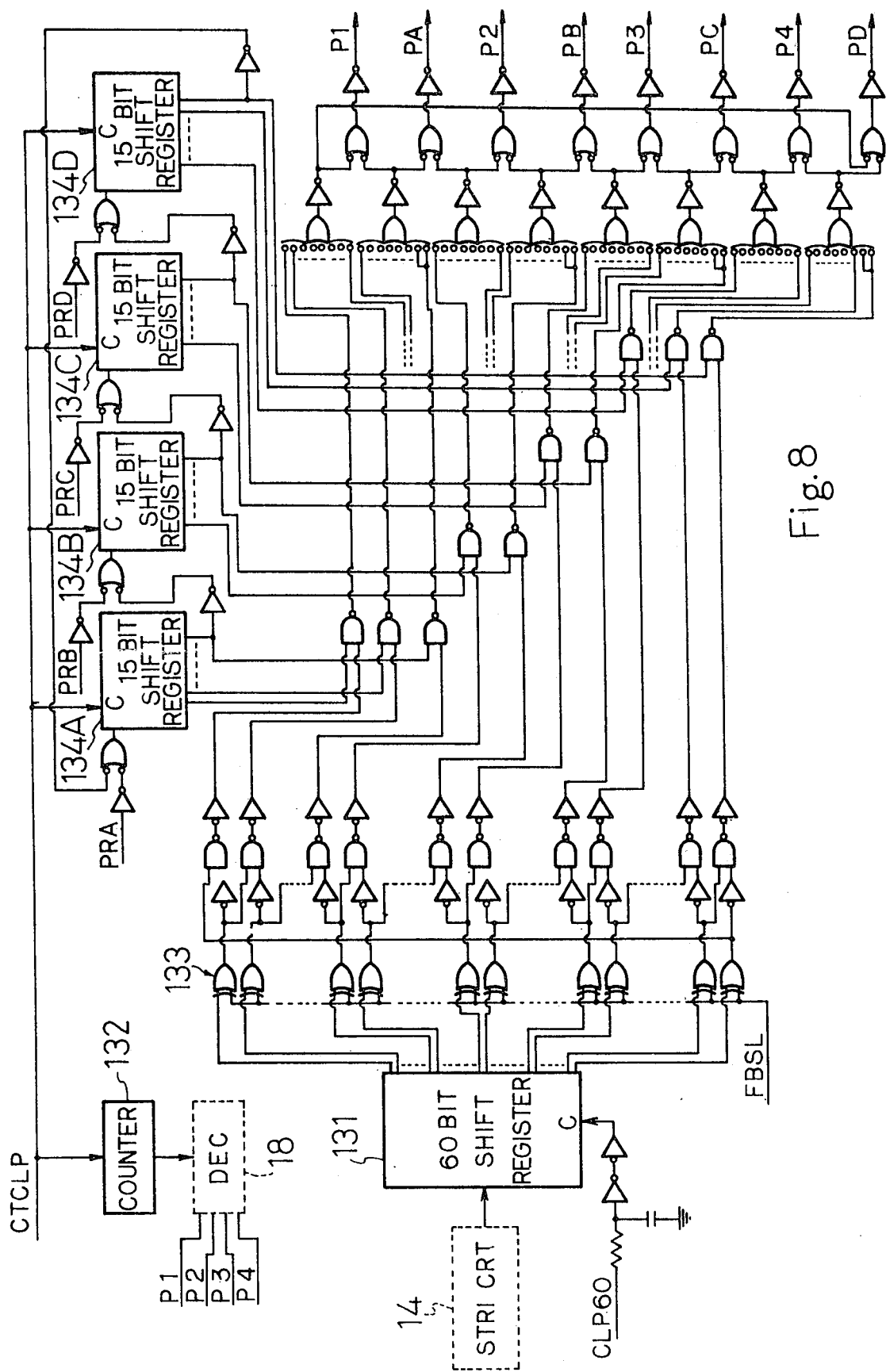
Figure 9:
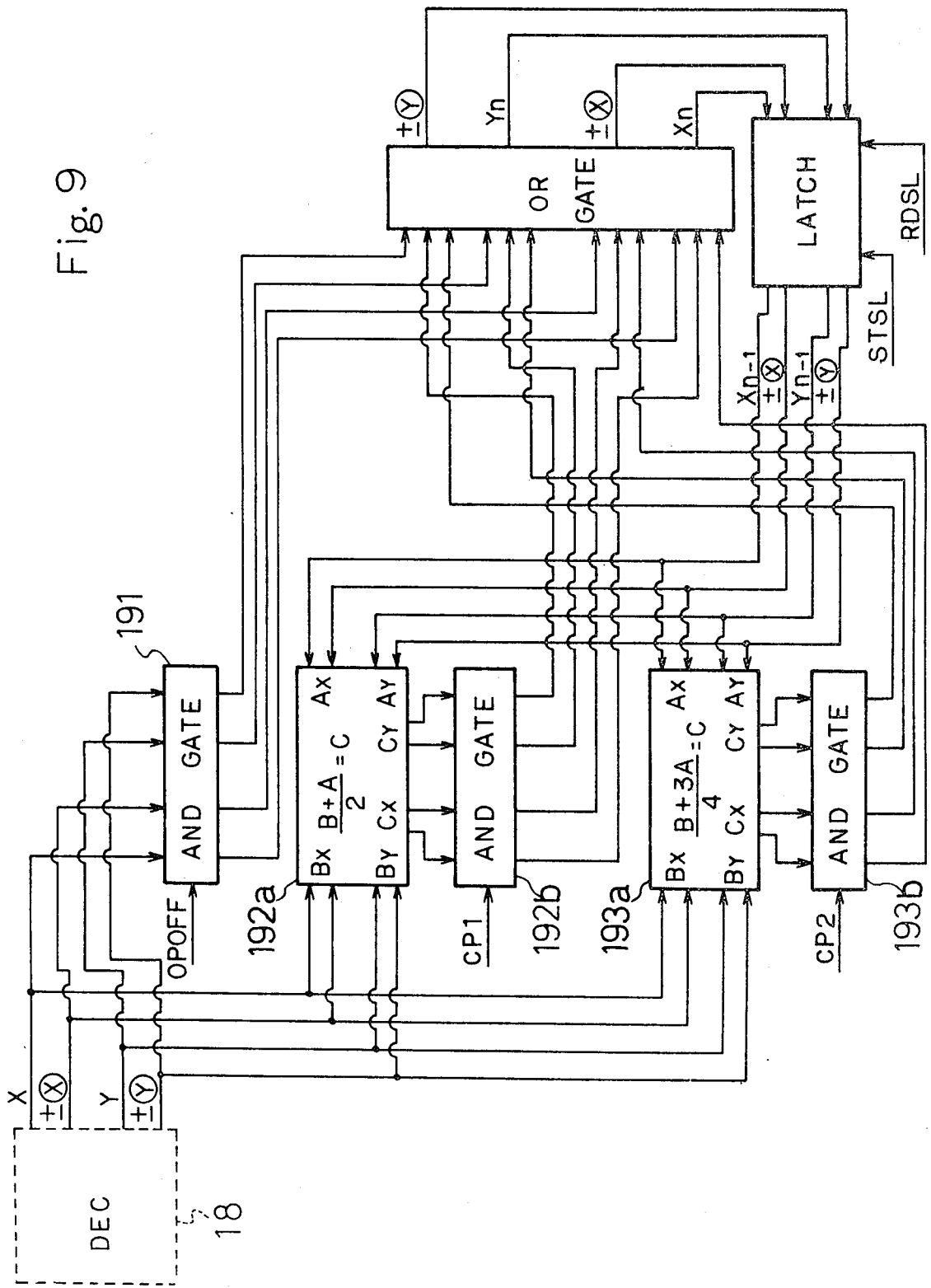
FIG. 9 is a block diagram of a calculating circuit of the present invention.
Figure 10:
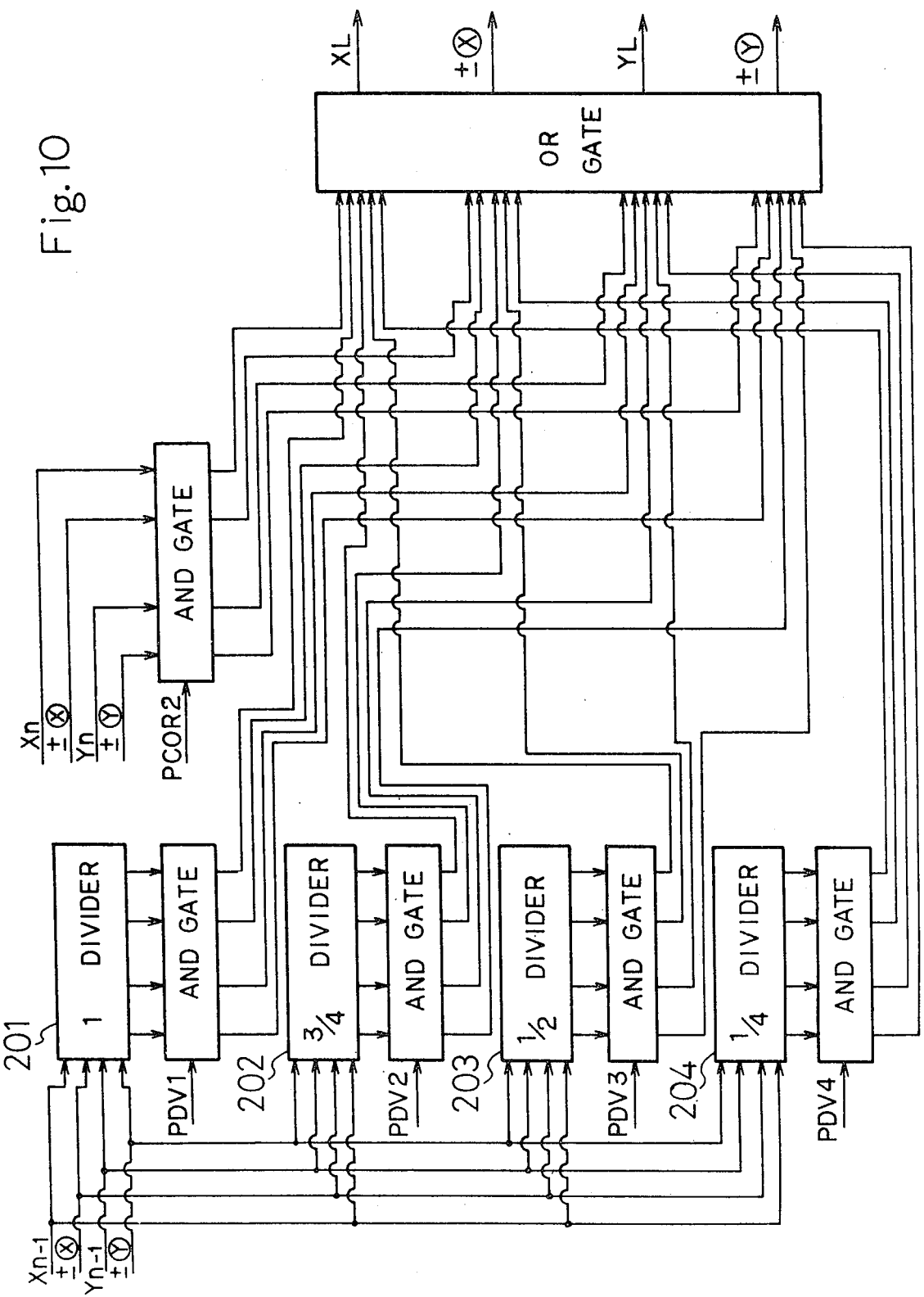
FIG. 10 is a block diagram of a dividing circuit used in this embodiment.

The trace controlling circuit 11 has a converter 12 shown in FIG. 6 comprising a switch controlling circuit 121 and a 60-bit analogue switch circuit 122. The electric signals which have been fed as inputs in parallel relation from these photoelectric cells 10 to the converter 12 are produced from the converter as outputs sequentially one by one. The signals from the converter 12 are rectified in their wave form by a Schmitt trigger circuit 14. A detecting circuit 13 is provided for storage of the signals from the Schmitt trigger circuit 14 in a 60-bit shift register 131, and detects an angular position which is the nearest to the predetermined basic reference point S on the circumference of the circle formed by 60 pieces of optical fibers and which is at the mid point between the neighboring two optical fibers assuming the status in which same is changing from brightness to darkness or the status in which same is changing from darkness to brightness, as viewed in the circumferential direction Z of the circle, in accordance with a plurality of output signals generating from the shift register 131. The detecting circuit 13 includes a counter 132 for counting the number of optical fibers 9 existing in the angular range from the reference point S to the mid point thus detected, as viewed in the circumferential direction Z. The counter 132 is capable of counting from 0 up to 14, to thereby produce coded signals. The angular positions at the mid points between respective neighboring optical fibers which have been detected by the detecting circuit 13 are represented by the output signals from the counter 132 and the signals P1, P2, P3, P4 which express the four absolute quadrants.

A synchro-generator 15 is comprised of a needle position detector 151 for producing synchronizing signals CHSL relating to a position of the needle 1a of the sewing machine, and a clock pulse generator 152 for producing 60 clock pulses CLP-60 in response to the synchronizing signals produced from said detector. After generation of sixty clock pulses from the clock pulse generator 152, the clock pulse generator further produces read signals RDSL. When a single clock pulse CLP-60 has been fed to the switch controlling circuit 121, a single control signal is produced from the switch controlling circuit 121. In response to the control signal, one of the switches in the 60-bit analogue switch circuit 122 is rendered closed, whereby a single electric signal is transmitted to the Schmitt trigger circuit 14. This is repeated to feed 60 electric signals to the Schmitt trigger circuit 14 in regular order. A frequency divider 16 divides the pulse signals of 1MHz generating from an oscillator 17 into the pulse signals of 100 KHz, and the signals thus divided are fed therefrom to the detecting circuit 13. In accordance with the directions from the center point B of the circle formed by the 60 pieces of optical fibers towards the mid points between respective two neighboring optical fibers, a pitch of stitch P, and the four absolute quadrants Q1, Q2, Q3, and Q4, there are predetermined the numbers of X, Y pulses of sixteen types and the positive and negative signs of these X, Y pulses which are necessary for shifting the supporting table 2 and mounting plate 4 along the X and Y axes, which cross each other at right angles. A decoder 18 produces the X, Y code signals and the sign code signals, which are respectively representing sets of X, Y pulses commensurate in number to an angular position detected by the detecting circuit 13, and the positive and negative signs of said X, Y pulses. A discriminating circuit 22 includes a binary counter 221 which is capable of counting from 0 up to 59. If the discriminating circuit 22 discriminates that a difference between the number of optical fibers 9 ($Vn-1$) precedingly counted by the counter 221 and the number of optical fibers 9($Vn$) succeedingly counted is within a given value, then the calculating circuit 19 is actuated. On the other hand, if the discriminating circuit 22 determines that the difference $|Vn-1-Vn|$ is beyond a given value, the dividing circuit 20 is actuated. The dividing circuit 20 includes a plurality of dividers for dividing the number of pulses at a plurality of predetermined dividing ratios, in accordance with a value of difference $|Vn-1-Vn|$. If the discriminating circuit 22 discriminates that a difference $|Vn-1-Vn|$ is beyond a given value, the reference point changing circuit 21 is actuated in like manner as in the dividing circuit. The reference point changing circuit 21 changes the reference point S to any of subsidiary reference points S1, S2, and S3, in response to the signals PA, PB, PC and PD representing the four relative quadrants, as best seen in FIG. 5. A frequency modulator 23 selects one type of frequency corresponding to the number of input pulses fed to the frequency modulator, from among many types of predetermined frequencies, in association with the number of pulses, and produces the pulse signals at the frequency thus selected, the number of which is equal in number to the number of input pulses. A pulse motor driving circuit 24 feeds X, Y drive signals to pulse motors PMX and PMY, respectively, in response to the X, Y pulses to be fed through a gate circuit 25 thereto and the signals representing the direction of shift of the supporting table 2 and mounting plate 4. The supporting table 2 and mounting plate 4 are thus shifted along the X and Y axes, by the running of the pulse motors PMX and PMY, respectively. A tracing direction controlling circuit 26 includes a binary counter 261 which is responsive to signals STSL to be produced after a given interval of time from the time at which read signals RDSL have been produced from the synchro-generator 15 and which counts the start signals STSL. The output signal from the binary counter 261 is compared with the signals representing the number of stitches set by a first and second digital switch 262 and 263, in a first and second comparator 264 and 265. A sequence circuit 27 feeds gate signals to the gate circuit 25, thereby rendering the circuit 25 open. A transfer controlling circuit 28 feeds to the gate circuit 25 the signals expressing the numbers of X, Y pulses necessary for returning the supporting table 2 and mounting plate 4 to the home loading position as well as the direction of shift of these members, independently of the operation of the trace controlling circuit 11.

Figure 1:
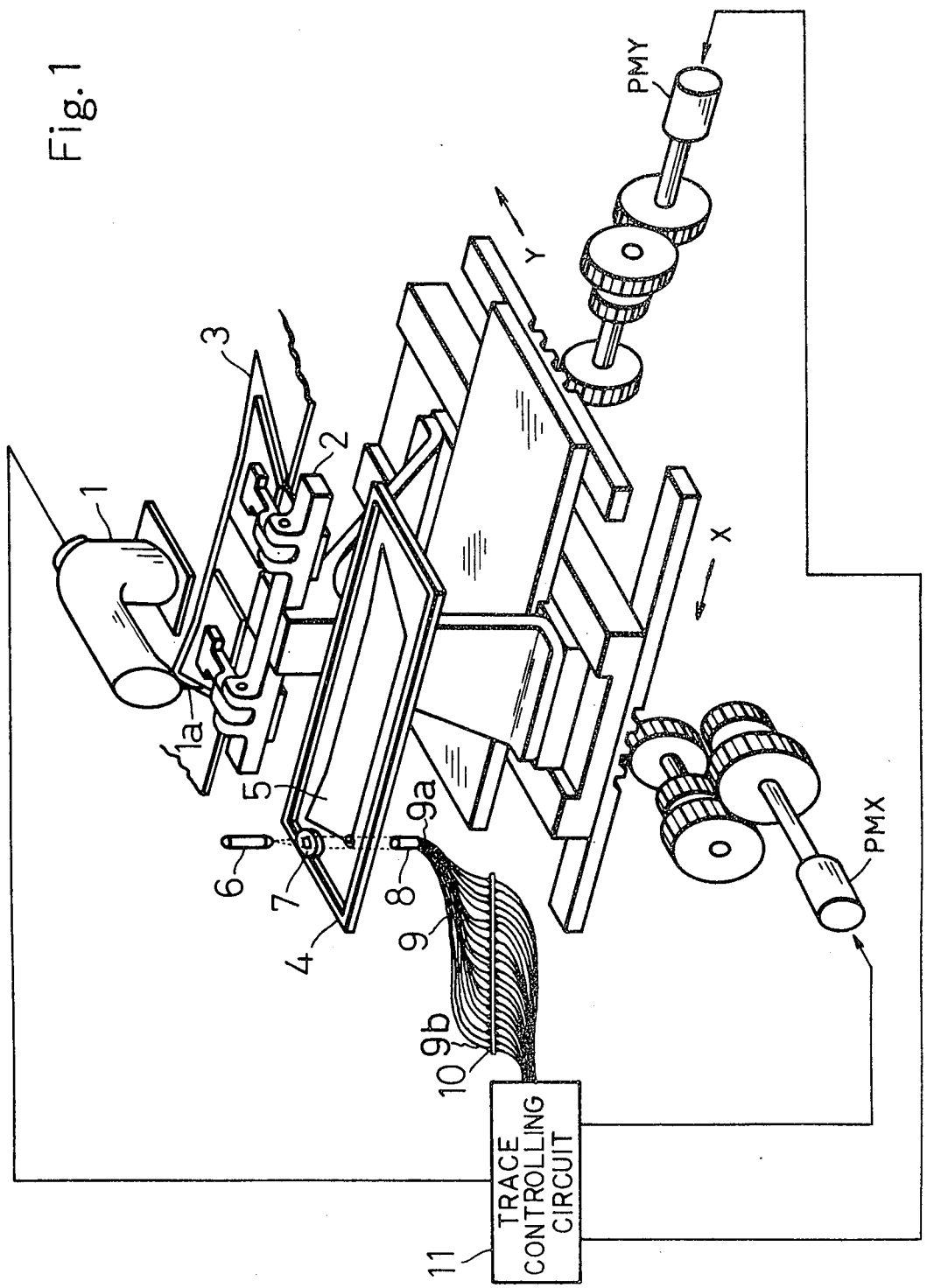
FIG. 1 shows a contour tracing sewing machine used in an embodiment of the present invention.
Figure 2:
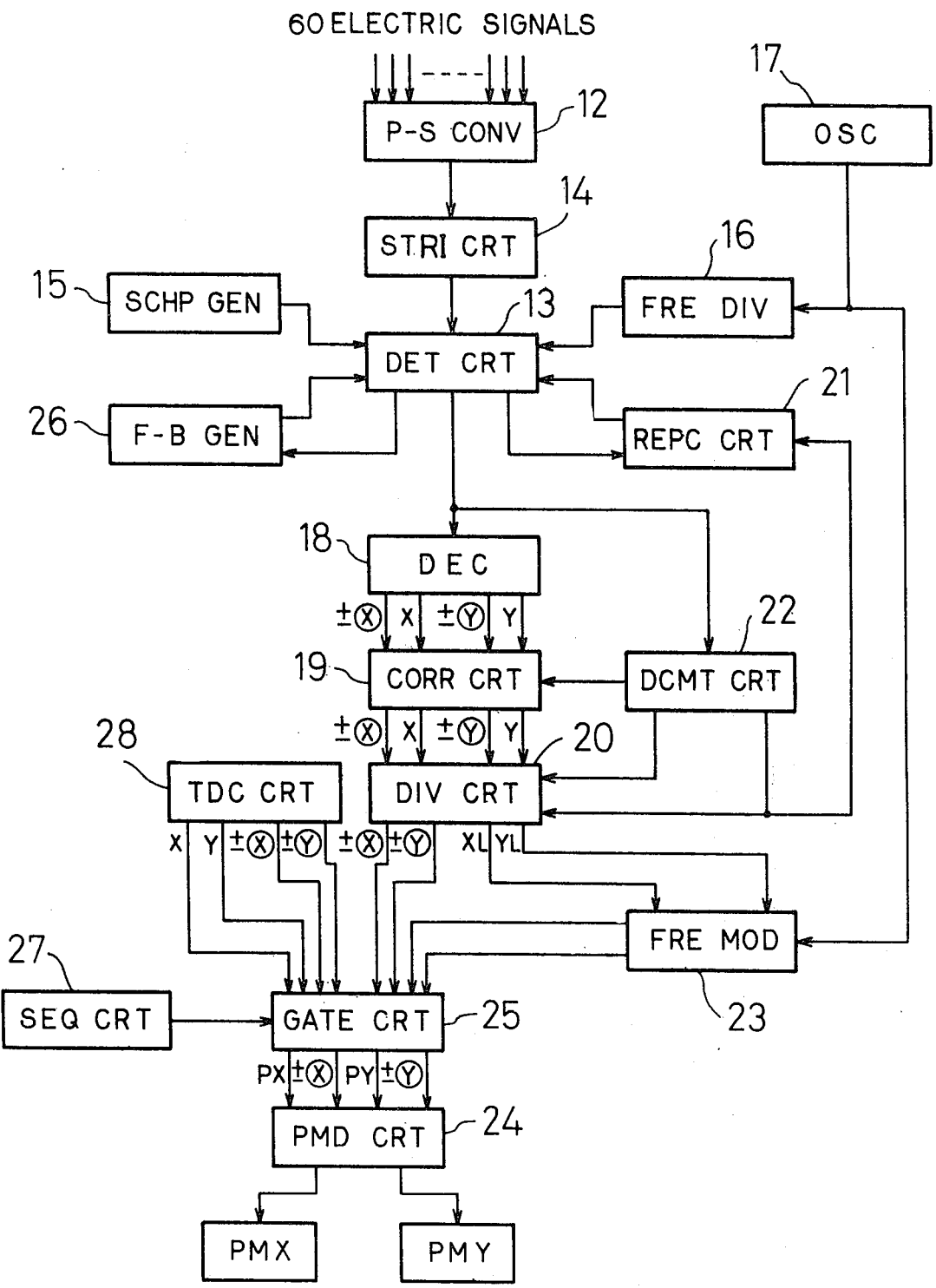
FIG. 2 is a block diagram of a trace controlling circuit used in the embodiment of the present invention.
Figure 3:
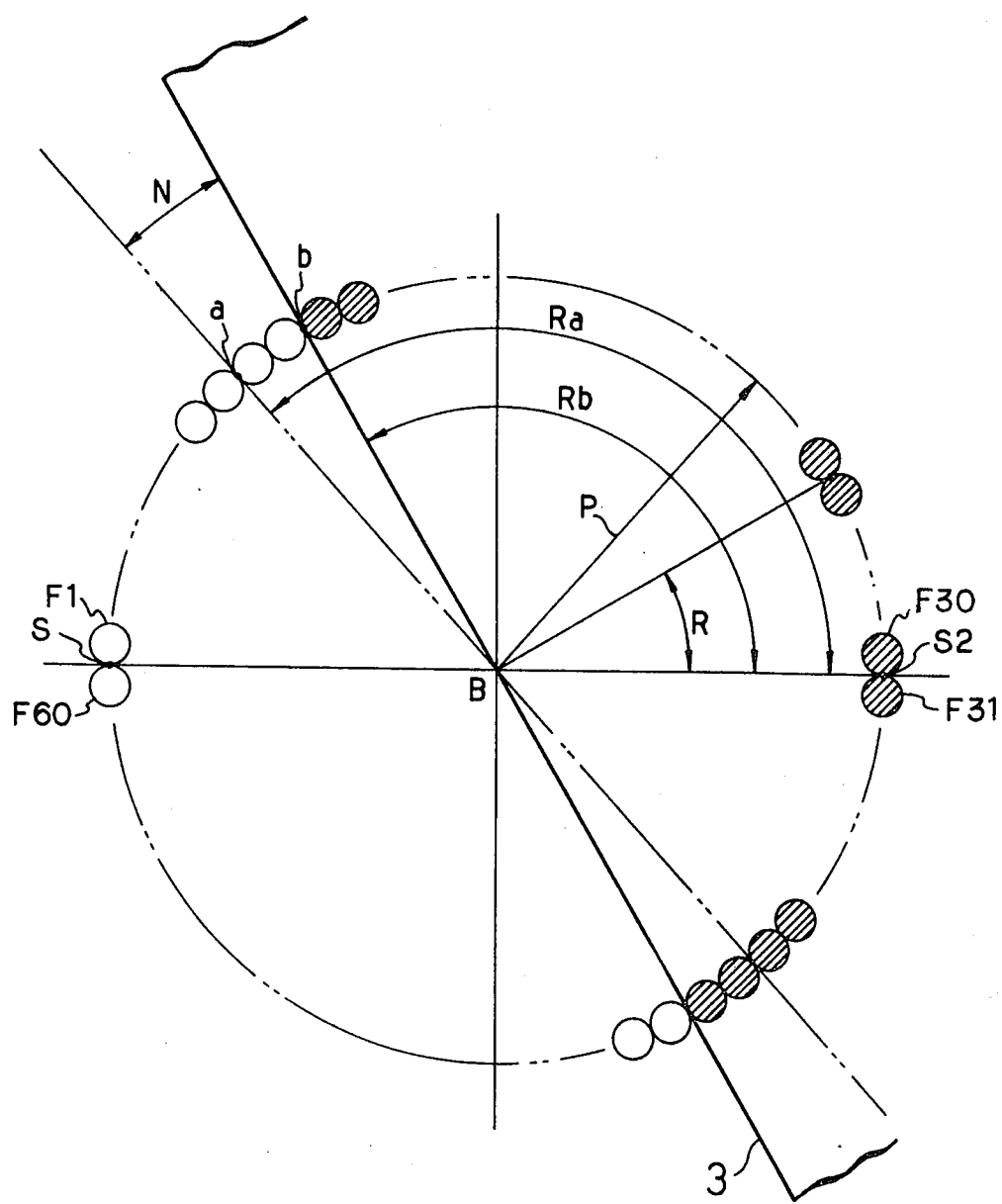
FIGS. 3 through 5 are plan views of a stitching templet and a sensing head used in the present invention.

In operation, referring first to FIGS. 3 and 5 which show plan views of the stitching templet 5 and sensing head 8, as viewed from above the mounting plate 4 in FIG. 1. In the embodiment shown, it is predetermined that the basic reference point S is at the mid point between the optical fiber F1 and the optical fiber F60, while the first reference point S1 is at the mid point between the optical fiber F15 and the optical fiber F16, the second reference point S2 is at the mid point between the optical fibers F30 and F31; and the third reference point S3 is at the mid point between the optical fibers F45 and F46, respectively. The number of back-tack stitches 3 is manually set on the first digital switch 262 as shown in FIG. 12. The sum of stitches to be formed on the workpiece 3 is manually set on the second digital switch 263.

Figure 4:
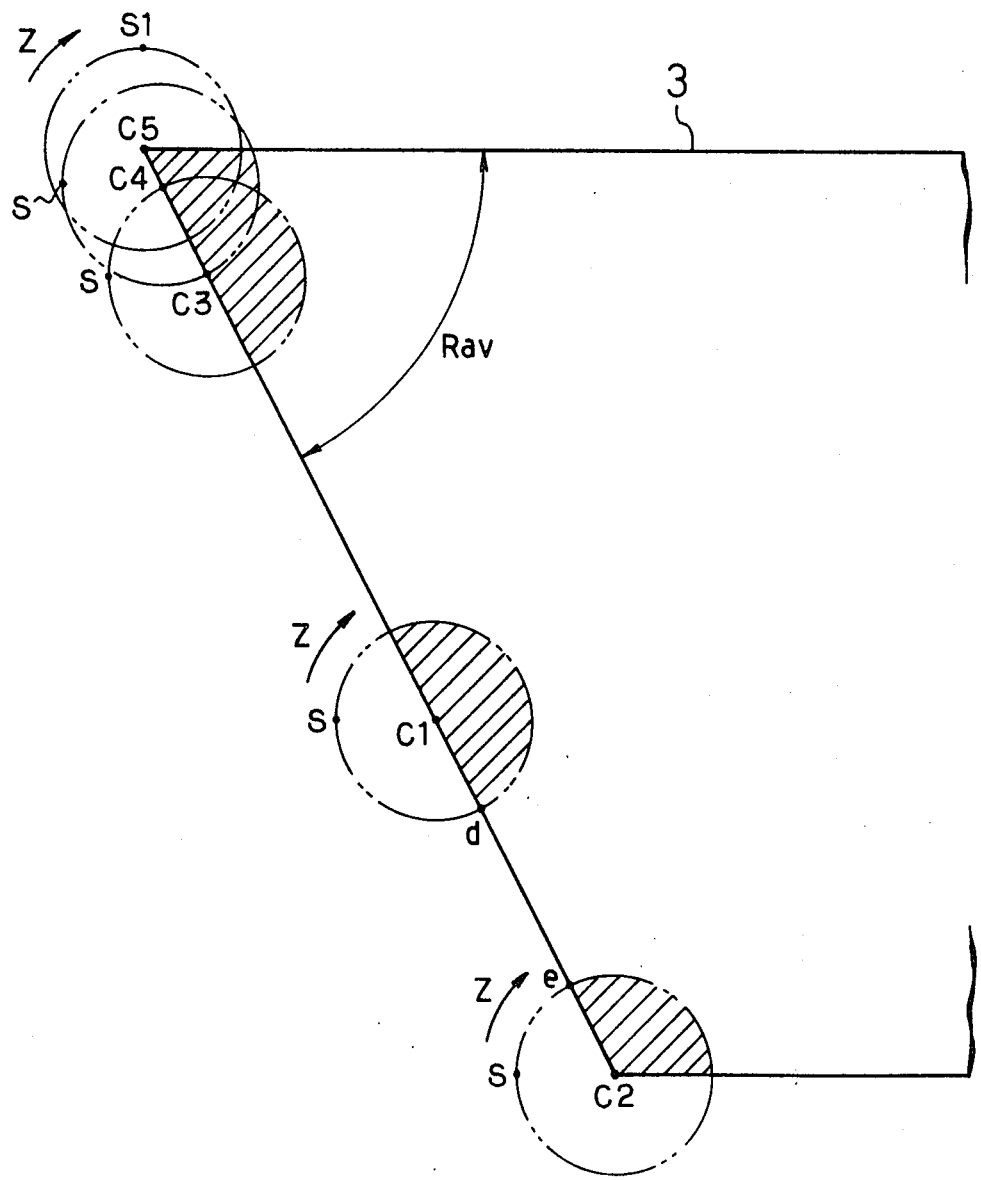

FIG. 4 is a plan view of the stitching templet 5 and sensing head 8 for showing a positional relationship therebetween.

As seen in FIG. 4, the supporting table 2 is positioned in a sewing position by actuating the transfer controlling circuit 28, in a manner that the point C1 predetermined on the circumferential portion of the stitching templet 5 may be positioned at the center point B of the light sensing head 8. In this embodiment it is so arranged that at the start of a tracing operation the tracing direction control circuit 26 produces retraction signals for shifting the supporting table 2 backwardly, i.e., the output signal FBSL from the circuit 26 is a high level of signal I. When the retraction signals are fed to the detecting circuit 13, the detecting circuit 13 will detect an angular position at the mid point $d$ between the neighboring two optical fibers assuming the status in which same is changing from darkness to brightness, as viewed in the circumferential direction Z. For a duration which the retraction signals are produced from the tracing direction controlling circuit 26, the supporting table 2 will be shifted at an interval pitch by pitch of stitch as at P from the point C1 towards the point C2 on the circumferential portion of the stitching templet 5. When the supporting table 2 has shifted until the point C2 on the circumferential portion of the stitching templet 5 meets the center point B of the light sensing head 8, stated otherwise, when three stitches have been formed on the workpiece 3, then the tracing direction controlling circuit 26 will produce advancing signals for shifting the supporting table 2 forwards, i.e., the output signal FBSL is a low level of signal zero. In response to the advancing signals thus produced, the detecting circuit 13 is changed over from the former detecting condition to another condition in which same detects an angular position at the mid point $e$ between the two neighboring optical fibers assuming the status in which they are changing brightness to darkness, as viewed in the circumferential direction Z. For a duration which advancing signals are being produced from the tracing direction controlling circuit 26, the supporting table 2 is shifted at an interval forwards from the point C2 on the circumferential portion of the stitching templet 5 towards point C3 thereof. The condition of detecting of the detecting circuit 13 is changed over from one to another according to the advancing and retracting signals generating from the tracing direction controlling circuit, thereby controlling the forward or backward motion of the supporting table, whereby back tacking can be performed to provide a secure anchorage at the start of a line of stitching.

Operation will be referred in conjunction with FIG. 3 to the case where an angle difference N between the angular position R$a$ at the mid point $a$ between the two optical fibers precedingly detected by the detecting circuit 13 and an angular position R$b$ at the mid point $b$ between the two optical fibers succeedingly detected by said circuit is within a given value.

As shown in FIG. 3, when the circumferential portion of the stitching templet 5 passes the mid point $b$ to thereby shield the light sensing head 8 from light, then 60 pieces of optical fibers 9 will transmit rays of light to part of 60 pieces of photoelectric cells 10 according to presence or absence of the stitching templet 5. Part of photoelectric cells which have received light will produce high level of electric signals. Parallel electric signals produced from 60 pieces of photoelectric cells 10 will be fed to the converter 12, from which the electric signals will be put out in series relation. The signals thus converted will be stored through the Schmitt trigger circuit 14 respectively in 60-bit shift register 131 in the detecting circuit 13. The output signals from the shift register 131 and the advancing signals from the tracing direction controlling circuit 26 will be respectively logicized in 60-exclusive OR gates 133 in the detecting circuit 13. When read signals RDSL are fed from the synchro-generator 15 to the detecting circuit 13, then clock pulses CTCLP will be respectively fed to four 15-bit shift registers 134A, 134B, 134C and 134D in the detecting circuit 13. At the same time only the input D1 of the latch in the reference point changing circuit 21 becomes a low level of signal zero and the other inputs D2, D3 and D4 become a high level of signal one, respectively. The latch invertedly produces the input signals on the outputs $\overline{D1}$, $\overline{D2}$, $\overline{D3}$, and $\overline{D4}$, and the inverted signals PRA, PRB, PRC and PRD from the outputs are respectively fed to the shift registers 134A, 134B, 134C and 134D. In response to the clock pulses CTCLP and the signals PRA, PRB, PRC and PRD, the shift registers produce a high level of signal one on the outputs in sequence. In accordance with 60 signals which have passed across these exclusive OR gates 133 and other gates as well as the output signals generating from four shift registers 134A through 134D, there will be produced the signals P1 through P4 expressing the absolute quadrants and the signals PA through PD which represent the relative quadrants. When one of these signals PA through PD becomes a low level of signal O, then generation of the clock pulses CTCLP will be interrupted. The angular position R$b$ detected by the detecting circuit 13 is represented by the output signals generating from the counter 132 which has counted the number of the clock pulses CTCLP as well as the signals P1 through P4 representing the absolute quadrants. Among the signals P1 through P4, the signal P1 representing the absolute quadrant Q1 in which the mid point $b$ is positioned is alone a low level of signal zero. When the output signals from the counter 132 and the signals P1 through P4 are fed to the decoder 18, then the decoder 18 will produce code signals which represent the numbers of a set of X, Y pulses and the positive and negative signs thereof, respectively. Likewise the counter 132, the counter 221 included in the discriminating circuit 22 counts the number of clock pulses CTCLP. By a difference $|Vn-1 - Vn|$ between the number of clock pulses $Vn-1$ precedingly counted by the counter 221 and the number of clock pulses $Vn$ succeedingly counted by the counter, the aforesaid angle difference N is expressed. Then, an angle comparator 223 makes a comparison between the value V obtained by subtracting the angle difference N from 30 pieces of optical fibers existing in the range of an angle of 180°, which is expressed by the equation $V = |30 - |Vn-1-Vn||$, and the value AV manually set on the angle digital switch 222. The value AV is determined, based upon an angle R$a$V (shown in FIG. 4) in one angular portion of the workpiece 3. If an angle difference N is within a given value, then the angle comparator 223 will produce signals PCOR1 and PCOR2. For a duration which the signals PCOR1 and PCOR2 are being produced, one of gate signals OP-OFF, CP1 and CP2 will be fed to one of three AND gates 191, 192$b$ and 193$b$ in the calculating circuit 19, depending upon a set position of a slection switch 224.

Assuming that R be representative of an angular position detected by the detecting circuit 13, then the numbers of X, Y pulses (XT, YT) necessary for shifting the supporting table 2 in the X and Y directions in parallel with the X and Y axes is determined by the following equation, based upon the angular position R:

$$XT = (P/M) \cos (\pi - R) \tag{1}$$

$$YT = (P/M) \sin (\pi - R) \tag{2}$$

wherein M is a unit length of shift of the supporting table 2 which is to be shifted when one pulse is fed to the pulse motors PMX and PMY, respectively. Whether the values of the numbers of X, Y pulses are positive or negative is determined on the assumption that the direction of arrow shown in FIG. 1 be a positive direction.

Assuming that BX and BY be representative of the numbers of X, Y pulses determined by the above equation based on the angular position R$b$, A$x$ and AY be representative of the numbers of X, Y pulses compensated for by the calculating circuit 19 based upon an angular position R$a$ detected, and $m$ and $n$ be representative of differences in number between these X, Y pulses, then the differences are represented by the following equations:

$$m = (BX - AX)$$

$$n = (BY - AY)$$

The calculating circuit 19 calculates the numbers of X, Y pulses (CX, CY) according to the following expressions, based upon the above-described differences in the number of X, Y pulses as well as the numbers of X, Y pulses (AX, AY).

$$CX = (AX + Kxm) \tag{3}$$

$$CY = (AY + Kxn) \tag{4}$$

wherein K is a constant within the range of $(0 < K < 1)$ and the value of K is predetermined.

The calculating circuit 19 does not perform calculation in case the selection switch 224 is set to a contact terminal CTO. In the case the selection switch 224 is set to a contact terminal CT1 or CT2, calculators 192$a$ and 193$a$ in the calculating circuit 19 perform calculation by minimizing the value of K to ½ or ¼.

As the numbers of X, Y pulses (XT, YT) and the values of CX and CY, there are adopted integral numbers which are approximate to the values obtained by calculations according to the formula (1), (2), (3) and (4).

So far as the angle difference N is within a given value, the discriminating circuit 22 leaves the dividing circuit 20 inoperative, such that the numbers of X, Y pulses produced from the calculating circuit 19 and coded signals representing the positive or negative sign of these pulses will be respectively fed directly to the frequency modulator 23 and the gate circuit 25. In response to the X, Y pulses fed from the gate circuit 25 to the pulse-motor drive circuit 24 and the signals representing the direction of shift of the supporting table 2, the pulse motor driving circuit 24 will produce X, Y drive signals. The pulse motors PMX and PMY thus energized by the X, Y drive signals cause the supporting table 2 and mounting plate 4 to shift along the X and Y axes, respectively.

If the angle difference N is within a given value, the above-described operation of the calculating circuit 19 is effected likewise in the case where a back tacking is performed.

The case will be described with reference to FIG. 5 where the angle difference N between an angular position $Ra$ at the mid point $a$ between the two optical fibers precedingly detected by the detecting circuit 13 and an angular position $Rb$ at the mid point $b$ between the two optical fibers succeedingly detected is beyond a given value.

First, let us assume the case where the detecting circuit 13 detects an angular position at the mid point between the neighboring two optical fibers assuming the condition in which same is changing from brightness to darkness.

Figure 11:
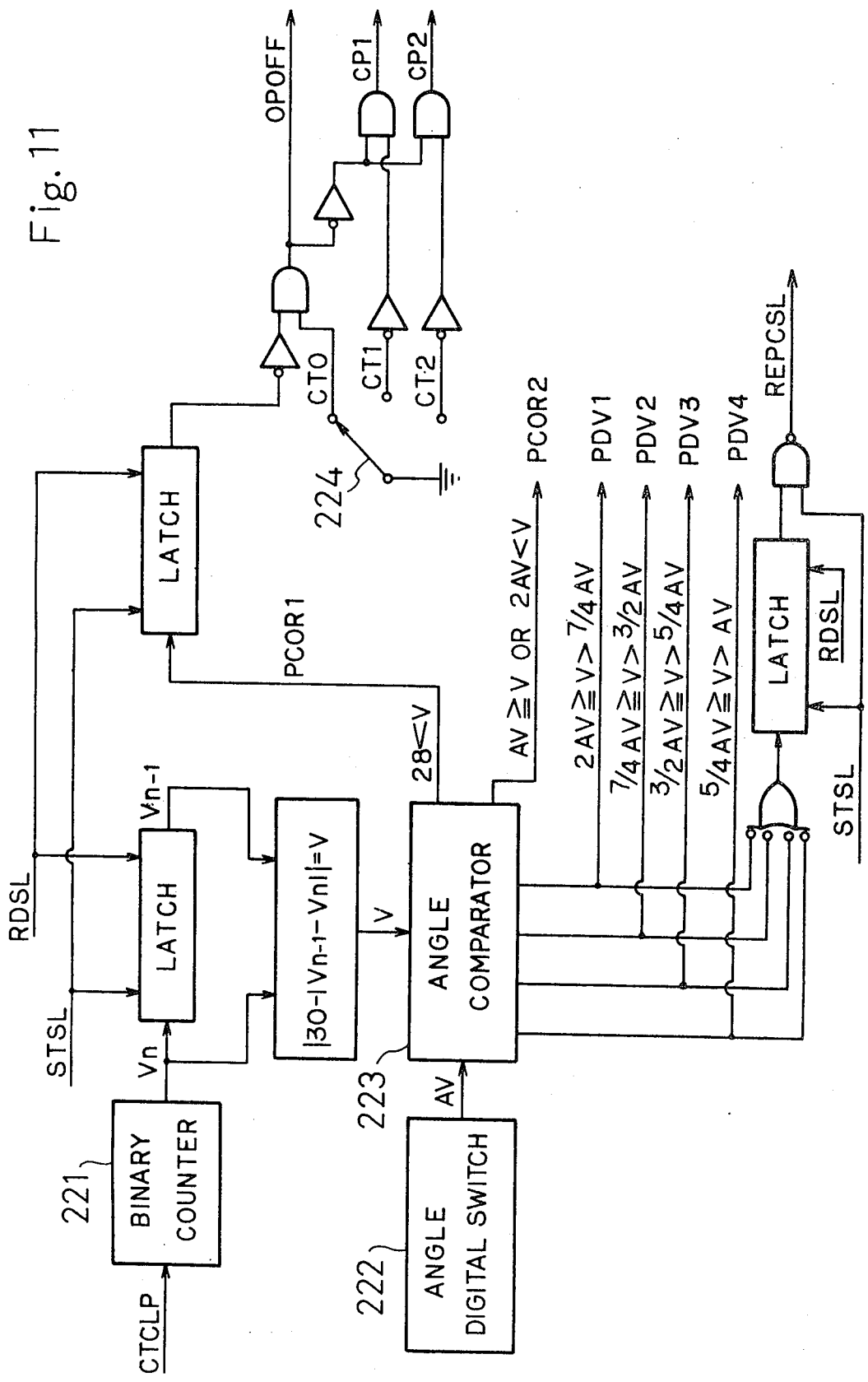
FIG. 11 illustrates a discriminating circuit used in the embodiment of the present invention.

When the discriminating circuit 22 has determined that angle difference N is beyond a given value, stated otherwise, when the discriminating circuit 22 has produced one of division signals PDV1, PDV2, PDV3 and PDV4 as shown in FIG. 11, then the dividing circuit 20 is effectively actuated. At this stage, the calculating circuit 19 remains inoperative, such that the X, Y code signals as well as sign code signals from the decoder 18 will be fed directly to the dividing circuit 20.

Operation of the dividing circuit 20 will be referred to below.

It is assumed that, in FIGS. 4 and 5, $Ra$ be representative of an angular position at the mid point $a$ detected by the detecting circuit 13 when the point C3 on the circumferential portion of the stitching templet 5 is positioned at the center point B of the light sensing head 8, and $Rb$ be representative of an angular position at the mid point $b$ detected by the detecting circuit 13 when the point C4 on the circumferential portion of the stitching templet 5 is positioned at the center point B of the light sensing head 8.

Assuming that CX and CY are representative of the numbers of pulses compensated for by the calculating circuit 19 as a result that the detecting circuit 13 has detected the angular position $Ra$, then the values of DX and DY which represent the numbers of pulses divided by the dividing circuit 20 as a result of the angular position $Rb$ being detected by the detecting circuit 13 will be obtained by the following expressions:

$$DX = G \times CX$$

$$DY = G \times CY$$

wherein G is a dividing ratio, and the value of dividing ratio is predetermined according to the aforesaid absolute value $V = |30 + |Vn+1 - Vn||$. In this embodiment, the values of dividing ratio are predetermined as being 1, $\frac{3}{4}$, $\frac{1}{2}$ and $\frac{1}{4}$, respectively.

According to the value of the aforesaid angle difference N, i.e., the absolute value V, the discriminating circuit 22 actuates one of the dividers 201, 202, 203 and 204 in the dividing circuit 20, and at the same time, in response to the production of one of the division signals PDV1 to PDV4, the output signal REPCSL from the discriminating circuit 22 changes from a low level of signal zero to a high level of signal one and enables the latch in the reference point changing circuit 21.

As seen in FIG. 5, if the angular position $Rb$ detected is positioned in the relative quadrant QB, then the signal PB representing the relative quadrant QB is a low level of signal zero, such that the reference point changing circuit 21 will feed high level of signals 1 only to the 15-bit shift register 134B in the detecting circuit 13. As a result, the basic reference point S will be changed to the first reference point S1, so that the detecting circuit 13 may detect an angular position at the mid point which is the nearest to the first reference point S1 and which is between two optical fibers assuming a condition in which same is changing from brightness to darkness, as viewed in the circumferential direction Z.

Division of the numbers of pulses and change of the reference point take place when the point C4 on the circumferential portion of the stitching templet 5 becomes positioned exactly at the center point B of the light sensing head 8. The X, Y code signals representing the numbers of X, Y pulses thus divided by the dividing circuit 20 will be fed through the frequency modulator 23 and gate circuit 25 to the pulse motor drive circuit 24. The pulse motor drive circuit 24 feeds the X, Y drive signals to respective pulse motor PMX, PMY, thereby shifting the supporting table 2 and mounting plate 4. The length of shift of the supporting table 2 is substantially equal to a value obtained by dividing the pitch of stitch P at a given dividing ratio G. If the supporting table 2 is shifted by a length equal to the value thus obtained, the point C5 in the angular portion on the circumferential portion of the stitching templet 5 meets the center point B of the sensing head 8. Thereafter, the tracing operation is performed in like manner as set forth in the foregoing, by deeming the first reference point S1 as the reference point.

The above-described operation is the case where advancing signals are produced from the tracing direction controlling circuit 26. Likewise in the case of the retracting signals being produced, respective members operate in the same manner as in the above-described case, except that the mode of detection of the detecting circuit 13 is reversed.

In the embodiment shown, in the event that one of the optical fibers 9 should be partly shaded from light by the circumferential portion of the stitching templet, there would be introduced an error in an angular position which is to be detected by the detecting circuit 13 by an angle corresponding to a single optical fiber due to sensitivity of the photoelectric cells 10. In such a case, the calculating circuit 19 is actuated to compensate for the error thus intorduced. The reset signals RESSL are produced when the supporting table 2 has been returned to its home loading position after the workpiece 3 has been seamed to a desired configuration and at the same time, the counter 261 and the flip-flops to which the reset signals RESSL have been fed are reset. Other counters, other flip-flops and the shift registers used in this embodiment are also reset by the read signals RDSL. The flip-flops produce a high level of signal one on the outputs Q in response to the signals RESSL and RDSL. The latches in the calculating circuit 19 and the discriminating circuit 22 hold input signals in response to the signal STSL and produce the held contents as output signals in response to the signal RDSL, and the held contents are cleared by the reset signal RESSL.

According to the present invention, the contour of a stitching templet molded to a desired shape and made of a light-shielding material is detected optically and by using digital signals, whereby a tracing operation is effected along the contour of the stitching templet, in synchronism with production of signals relating to a position of a needle of the sewing machine, thereby seaming the workpiece to a desired configuration, thus the automatic seaming work being facilitated with improved efficiency.

We claim:

1. A contour tracing sewing machine for controlling the movement of workpiece holding means, which is connected to each X, Y pulse motor for transferring a workpiece along X, Y axes perpendicular to each other, by tracing the contour of a prearranged templet which is operatively associated with said workpiece holding means in order to form a seam conformable to said contour on said workpiece by sewing instrumentalities, comprising:
   a. light supplying means;
   b. a plurality of light transmitting means each including a first end portion and a second end portion, said first end portions being arranged in a circle and opposite to said light supplying means;
   c. said templet being adapted to move transversely between said light supplying means and said first end portions;
   d. a plurality of photoelectric converting means each connected to said second end portion for generating electric signals representative of the presence or the absence of said templet according to the transmission or the untransmission of light rays emitted by said light supplying means;
   e. first means for selecting a desired reference point from among a basic reference point and many reference points predetermined on said circle;
   f. point detecting means responsive to said electric signals for detecting the transitional points which are in the first state of the transition from said presence to said absence or in the second state of the transition from said absence to said presence in a predetermined circumferential direction of said circle;
   g. second means for selecting a transitional point nearest to said selected reference point in said predetermined circumferential direction from among said detected transitional points;
   h. determining means for determining a set of X, Y pulse numbers on the basis of the radius of said circle and the angle formed by the reference segment joining the center of said circle to said basic reference point and the segment joining said center to said selected transitional point;
   i. difference detecting means for detecting the angle difference between the first angle formed by said reference segment and the segment joining said center to said transitional point precedingly selected by said second means and the second angle formed by said reference segment and the segment joining said center to said transitional point succeedingly selected thereby;
   j. dividing means for selecting a dividing value corresponding to said detected angle difference from among a variety of predetermined dividing values, and for dividing said set of X, Y pulse numbers precedingly determined by said determining means by said selected dividing value;
   k. selection controlling means for controlling said first means so that said first means selects a reference point nearest to said transitional point succeedingly selected by said second means in the direction opposite to said predetermined circumferential direction according to said detected angle difference and said second angle from among said basic reference point and many reference points;
   l. means for changing said reference point precedingly selected by said first means into said reference point succeedingly selected thereby;
   m. actuating means for actuating said dividing means, selection controlling means and changing means when said detected angle difference is beyond a predetermined extent of angular value; and,
   n. generating means for generating the X, Y pulse signals the X, Y pulse numbers of which are respectively equal to said divided X, Y pulse numbers, and for supplying said X, Y pulse signals to said X, Y pulse motors.

2. A contour tracing sewing machine controlling the movement of workpiece holding means, which is connected to each X, Y pulse motors for transferring a workpiece along X, Y axis perpendicular to each other, by tracing the contour of a prearranged templet which is operatively associated with said workpiece holding means in order to form a seam conformable to said contour on said workpiece by sewing instrumentalities, said sewing machine comprising:
   a. light supplying means;
   b. a plurality of light transmitting means each including a first end portion and a second end portion, said first end portions being opposite to said light supplying means and arranged in a circle the radius of which is equal to the distance (P) between stitches to be produced on said workpiece;
   c. said templet being adapted to move transversely between said light supplying means and said first end portions;
   d. a plurality of photoelectric converting means each connected to said second end portion for generating electric signals representative of the presence or the absence of said templet according to the transmission or the untransmission of light rays emitted by said light supplying means;
   e. a reference point predetermined on said circle;
   f. point detecting means responsive to said electric signals for detecting the transitional points which are in the first state of the transition from said presence to said absence or in the second state of the transition from said absence to said presence in a predetermined circumferential direction of said circle;
   g. means for selecting a transitional point nearest to said reference point in said predetermined circumferential direction from among said detected transitional points;
   h. means for determining a set of X, Y pulse numbers on the basis of said radius and the angle formed by the reference segment joining the center of said circle to said reference point and the segment joining said center to said selected transitional point;

i. driving means for generating X, Y pulse signals on the basis of the set of X, Y pulse numbers determined by said determining means and driving said X, Y pulse motors in relationship with the position of the needle of said sewing instrumentalities;

j. difference detecting means for detecting the angle difference between the angle formed by said reference segment and the segment joining said center to said transitional point precedingly selected by said selecting means and the angle formed by said reference segment and the segment joining said center to said transitional point succeedingly slected thereby;

k. calculating means for detecting the pulse differences between the X, Y pulse numbers of the X, Y pulse signals, which are precedingly generated by said driving means on the basis of the set of X, Y pulse numbers preceding determined by said determining means, and the set of X, Y pulse numbers succeedingly determined thereby, and for summing up the X, Y pulse numbers of the X, Y pulse signals preceding generated by said driving means and the X, Y pulse numbers proportional to and smaller than said pulse differences;

l. actuating means for actuating said calculating means when said detected angle difference is within a predetermined extent of angular value; and, m. control means for controlling said driving means so that the X, Y pulse numbers of the X, Y pulse signals to be succeedingly generated thereby are respectively equal to said summed X, Y pulse numbers.

3. A contour tracing sewing machine in accordance with claim 2, wherein said control means includes a manual switch for making said calculating means inoperative and controls said driving means so that the X, Y pulse numbers of X, Y pulse signals to be generated by said driving means are respectively equal to the X, Y pulse numbers determined by said determining means during the operation of the manual switch.

4. A contour tracing sewing machine in accordance with claim 2, including state changing means for changing the state of said transitional points to be detected by said point detecting means either from said first state to said second state or from said second state to said first state, whereby the forward movement and the backward movement of said workpiece holding means are controlled by said state changing means.

5. A contour tracing sewing machine in accordance with claim 4, wherein said state changing means includes a counter for counting the number of stitches to be produced on said workpiece and applies to said point detecting means a command signal for changing the state of the transitional points to be detected by said point detecting means when the number counted by the counter coincides with a predetermined number of stitches, and said workpiece holding means is moved forward or backward according to said command signal.

6. A contour tracing sewing machine for controlling the movement of workpiece holding means, which is connected to each of X, Y pulse motors for transferring a workpiece along X, Y axis perpendicular to each other, by tracing the contour of a prearranged templet which is operatively associated with said workpiece holding means in order to form a seam conformable to said contour on said workpiece by sewing instrumentalities, said sewing machine comprising:

a. light supplying means;

b. a plurality of light transmitting means each including a first end portion and a second end portion, said first end portions being successively arranged in a circle and opposite to said light supplying means;

c. said templet being adapted to move transversely between said light supplying means and said first end portions;

d. a plurality of photoelectric converting means each connected to said second end portion for generating electric signals representative of the presence or the absence of said templet according to the transmission or the untransmission of light rays emitted by said light supplying means;

e. one of multiple mid points between respective neighboring two first end portions being predetermined as a reference point;

f. means for storing multiple sets of X, Y pulse numbers which each is corresponding to the mid point between said neighboring two first end portions and predetermined on the basis of the radius of said circle and the angle formed by the reference segment joining the center of said circle to said reference point and the segment joining the center to said mid point;

g. point detecting means responsive to said electric signals for detecting said mid point which is in the transitional state from said presence to said absence or from said absence to said presence;

h. means for counting the number of the mid points existing from said reference point to said mid point detected by said point detecting means in a predetermined circumferential direction of said circle and for extracting a set of X, Y pulse numbers corresponding to said detected mid point from said storing means; and, i. means for generating the X, Y pulse signals, the X, Y pulse numbers of which are respectively equal to said X, Y pulse numbers and for driving said X, Y pulse motors in relationship with the position of the needle of said sewing instrumentalities.

7. A contour tracing sewing machine for controlling the movement of a workpiece holder, which is connected to each of X, Y pulse motors for transferring a workpiece along X, Y axis perpendicular to each other, by tracing the contour of a prearranged templet in order to form a seam conformable to said contour on said workpiece by sewing instrumentalities, said sewing machine comprising:

a. a light source;

b. a plurality of light transmitting fibers each having a first end portion and a second end portion, said first end portions being opposite to said light source and successively arranged in a circle the radius of which is equal to the distance (P) between stitches to be produced on said workpiece;

c. a mounting plate made of a transparent material and attached to said workpiece holder so as to be movable transversely between said light source and said first end portions;

d. said templet being made of a light-shielding material and positioned on said mounting plate;

e. a plurality of photoelectric sensors each connected to said second end portion for generating electric signals representative of the presence or absence of said templet according to the transmission or the untransmission of light rays emitted by said light source;

f. one of multiple mid points between respective neighboring two first end portions being predetermined as a reference point;

g. means for storing multiple sets of X, Y pulse numbers which each is corresponding to the mid point between said neighboring two first end portions and predetermined on the basis of the radius of said circle and the angle formed by the reference segment joining the center of said circle to said reference point and the segment joining the center to said mid point;

h. means for generating pulses at a high frequency in relationship with the position of the needle of said sewing instrumentalities;

i. state searching means responsive to said electric signals for sequentially searching the state of said mid point from the state of said reference point in a predetermined circumferential direction of said circle synchronously with each of the pulses generated by said generating means, and for thereby detecting the first transitional state of said mid point from said presence to said absence or the second transitional state of said mid point from absence to said presence;

j. a counter for counting the number of the pulses generated by said generating means and extracting said set of X, Y pulse numbers from said storing means;

k. a logic circuit for interrupting said generating means from generating said pulses when said state searching means has detected said first transitional state or said second transitional state;

l. means for changing the transitional state to be detected by said state searching means either from said first transitional state to said second transitional state or from said second transitional state to said first transitional state; and, m. driving means for generating X, Y pulse signals, the X, Y pulse numbers of which are respectively equal to the X, Y pulse numbers extracted according to the output signal of said counter at the stoppage of the generation of said pulses, and for driving said X, Y pulse motors.

* * * * *